United States Patent
Yang et al.

(10) Patent No.: US 6,731,999 B1
(45) Date of Patent: May 4, 2004

(54) WAFER START ORDER RELEASE ALGORITHM IN A FOUNDRY FAB

(75) Inventors: Terry Yang, Hsinchu (TW); James Chu, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 19 days.

(21) Appl. No.: 10/038,712

(22) Filed: Jan. 2, 2002

(51) Int. Cl.[7] .............................................. G06F 19/00
(52) U.S. Cl. ...................................................... 700/102
(58) Field of Search ................................... 700/99–103

(56) References Cited

U.S. PATENT DOCUMENTS

| | | | |
|---|---|---|---|
| 4,887,218 A | 12/1989 | Natarajan | 364/468 |
| 4,896,269 A * | 1/1990 | Tong | 700/101 |
| 5,093,794 A | 3/1992 | Howie et al. | 364/468 |
| 5,369,570 A | 11/1994 | Parad | 364/401 |
| 5,594,639 A | 1/1997 | Atsumi | 364/468.14 |
| 5,796,614 A | 8/1998 | Yamada | 364/468.13 |
| 5,818,716 A * | 10/1998 | Chin et al. | 700/100 |
| 6,119,102 A | 9/2000 | Rush et al. | 705/29 |
| 6,272,389 B1 * | 8/2001 | Dietrich | 700/101 |

* cited by examiner

*Primary Examiner*—Leo Picard
*Assistant Examiner*—R Jarrett
(74) *Attorney, Agent, or Firm*—George O. Saile; Stephen B. Ackerman

(57) ABSTRACT

A methodology that provides for control of lot release control in a production environment. The method provides a start-order release system to achieve output maximization and cycle time minimization. This is accomplished using a lot release method that allows for multiple products that have different due dates and different process flows. Linear programming techniques are used to provide optimum start and customer delivery dates and maintain high resource utilization.

17 Claims, 6 Drawing Sheets

---

304 — X-ratio defination of each lot described as follows:
X-ratio=$(C_i-D)T$
302 — Where $C_i$= Commited due date of $i$th lot
  D = Wafer start date
  $T_i$= Theoretical process time of $i$th lot 310 — The upper bound constraint generatio algoritm uses an LP model to determine the upper bound constraint of each technology to avoid bottlenecks. The LP model is shown as follows:

Objective Functions:
320 — Max daily output: $Y = X_1 + X_2 + \ldots + X_i$

Subject to:

330 — $\begin{cases} a_{11}X_1 + a_{12}X_2 + \ldots + a_{1j}X_j \leq S_1 \times W_1 \times A_1 \times 24 \text{ (The first tool Constraint)} \\ a_{21}X_1 + a_{22}X_2 + \ldots + a_{2j}X_j \leq S_2 \times W_2 \times A_2 \times 24 \text{ (The second tool Constraint)} \\ a_{i1}X_1 + a_{i2}X_2 + \ldots + a_{ij}X_j \leq S_i \times W_i \times A_i \times 24 \text{ (The $i$th tool Constraint)} \end{cases}$ $X_1 \geq 0, X_2 \geq 0, \ldots, X_j \geq 0$ Where Y = daily start quantity
  $X_j$ = the daily start quantity of $j$th tecnology
  $A_{ij}$ = the repetitive times of $j$th tool type in $j$th technology process flow
  $S_i$ = total tool sets of $i$th tool type
  $W_i$ = WPH(wafer per hour) of $i$th tool type
  $A_i$ = tool available time of $i$th toll type 304 — X-ratio defination of each lot described as follows:
302 — X-ratio=$(C_i - D)T$
Where $C_i$ = Commited due date of $i$th lot
   $D$ = Wafer start date
   $T_i$ = Theoretical process time of $i$th lot 310 — The upper bound constraint generatio algoritm uses an LP model to determine the upper bound constraint of each technology to avoid bottlenecks. The LP model is shown as follows:

Objective Functions:

320 — Max daily output: $Y = X_1 + X_2 + \ldots + X_i$

Subject to:

330 —
$$a_{11}X_1 + a_{12}X_2 + \ldots + a_{1j}X_j \leq S_1 \times W_1 \times A_1 \times 24 \text{ (The first tool Constraint)}$$
$$a_{21}X_1 + a_{22}X_2 + \ldots + a_{2j}X_j \leq S_2 \times W_2 \times A_2 \times 24 \text{ (The second tool Constraint)}$$
$$a_{i1}X_1 + a_{i2}X_2 + \ldots + a_{ij}X_j \leq S_i \times W_i \times A_i \times 24 \text{ (The ith tool Constraint)}$$

$$X_1 \geq 0, X_2 \geq 0, \ldots, X_j \geq 0$$

Where $Y$ = daily start quantity
   $X_j$ = the daily start quantity of $j$th tecnology
   $A_{ij}$ = the repetitive times of $j$th tool type in $j$th technology process flow
   $S_i$ = total tool sets of $i$th tool type
   $W_i$ = WPH(wafer per hour) of $i$th tool type
   $A_i$ = tool available time of $i$th toll type

FIG. 3

Simulatio Examples

| Lot | X-ratio | Product | Quantity | Technology Group |
|---|---|---|---|---|
| C31574 | 3.6 | TM5068 | 25pcs | 50 Logic |
| C31463 | 4.8 | TM5799 | 25pcs | 50 Logic |
| C41232 | 5.0 | TM3757 | 25pcs | SRAM |
| C41272 | 3.3 | TM3836 | 25pcs | SRAM |
| C41272 | 5.1 | TM6182 | 25pcs | SRAM |
| C31575 | 3.6 | TM6694 | 25pcs | SRAM |
| C31464 | 5.0 | TM3605 | 25pcs | 35 Logic |
| C41233 | 3.3 | TM5577 | 25pcs | 35 Logic |
| C31576 | 5.2 | TM6687 | 25pcs | 35 Logic |
| C31465 | 4.0 | TM7658 | 25pcs | 25 Logic |
| C31234 | 4.1 | TM6836 | 25pcs | 25 Logic |
| C41274 | 5.8 | TM9989 | 25pcs | 25 Logic |

*FIG. 4A*

X-Ratio Bound - Rule 1

| Lot | X-ratio | Product | Quantity | Technology Group |
|---|---|---|---|---|
| C41233 | 3.3 | TM5577 | 25pcs | 35 Logic |
| C41272 | 3.3 | TM3836 | 25pcs | SRAM |
| C31575 | 3.6 | TM6694 | 25pcs | SRAM |
| C31574 | 3.6 | TM5068 | 25pcs | 50 Logic |

*FIG. 4B*

Lower Bound - Rule 2

| Lot | X-ratio | Product | Quantity | Technology Group |
|---|---|---|---|---|
| C31465 | 4.0 | TM7658 | 25pcs | 25 Logic |
| C41234 | 4.1 | TM6836 | 25pcs | 25 Logic |

*FIG. 4C*

Upper Bound - Rule 3

| Lot | X-ratio | Product | Quantity | Technology Group |
|---|---|---|---|---|
| C31463 | 4.8 | TM5799 | 25pcs | 50 Logic |
| C31464 | 5.0 | TM3605 | 25pcs | 35 Logic |
| C31576 | 5.2 | TM6687 | 25pcs | 35 Logic |
| C41274 | 5.8 | TM9889 | 25pcs | 25 Logic |

*FIG. 4D*

Final Lot Release Order

| Lot | X-ratio | Selected by | Quantity | Technology Group |
|---|---|---|---|---|
| C41233 | 3.3 | Rule 1 | 25pcs | 35 Logic |
| C41272 | 3.3 | Rule 1 | 25pcs | SRAM |
| C31575 | 3.6 | Rule 1 | 25pcs | SRAM |
| C31574 | 3.6 | Rule 1 | 25pcs | 50 Logic |
| C31465 | 3.6 | Rule 2 | 25pcs | 25 Logic |
| C41234 | 4.1 | Rule 2 | 25pcs | 25 Logic |
| C31463 | 4.8 | Rule 3 | 25pcs | 35 Logic |
| C31464 | 5.0 | Rule 3 | 25pcs | 35 Logic |
| C31576 | 5.2 | Rule 3 | 25pcs | 35 Logic |
| C41274 | 5.8 | Rule 3 | 25pcs | 25 Logic |

*FIG. 4E*

WAFER START ORDER RELEASE ALGORITHM IN A FOUNDRY FAB

BACKGROUND OF THE INVENTION

1. Field of Invention

This invention relates generally to optimization of scheduling and release of foundry fab wafer orders and, more particularly, to a lot release control algorithm in a foundry fab producing multiple products that have different due dates and different process flows.

2. Description of Related Art

In a typical foundry making wafers there are many constraints that affect the efficiency of the process. For optimization of the entire process there must be an attempt to maximize the output of the wafers and minimize the entire cycle from start to finish. There is no systematic optimized order release model that provides this scheduling. With the many variables present in running a wafer fab line, conflicts may result in idle time for the tools and wait time for the product. Even worse, promised delivery dates to customers can be missed when the wafer fab becomes too busy due to conflicts and delays with other processing.

On-time delivery of wafer is also impacted by bottlenecks caused by tool problems. Once tool problems present themselves, all schedules using the malfunctioning tools are delayed. This can cause a ripple effect that has a major impact on the current customer's wafers and on subsequent orders. Without a good method to factor in these impacts, it becomes difficult to give the customers accurate new completion dates. With optimized order release capability, schedules can more successfully be met with the result of happier and retained customers.

Several methods or systems related to wafer process control are available. In U.S. Pat. No. 4,887,218 (Natarajan) a conceptual decision analysis tool for production release planning is described. In U.S. Pat. No. 5,369,570 (Parad) a method for continuous real-time management of heterogeneous interdependent resources is described. In U.S. Pat. No. 5,796,614 (Yamada) a level-by-level explosion method for material requirements planning is provided. In U.S. Pat. No. 5,594,639 (Atsumi) an order process control model is described. In U.S. Pat. No. 6,119,102 (Rush et al.) a Manufacturing Requirements Planning (MRP) system is provided. Finally, in U.S. Pat. No. 5,093,794 (Howie et al.) a job scheduling system for jobs without special purpose coding is provided.

An optimized order release algorithm could save significant time and money in a number of situations and cut down on missed schedules that could result in a loss of customers.

SUMMARY OF THE INVENTION

This invention provides a start order release method to achieve maximum output with a minimum of cycle time, thus saving processing time and money due to the increased efficiencies from the method. The first overall objective is to provide a control model that with a planned step-by-step process optimizes release of work lots in a manufacturing line.

A second, more specific, objective is to provide a set of control algorithms to determine the most optimum control model for production of lots, taking into consideration the start date of processing, the committed due date, theoretical process time, and customers' needs.

Another specific objective is to provide lower and upper bound constraints to control the processing using linear programming techniques on which the final development of the Start To Build (STB) plan is based.

These objectives are achieved by using a specified lot release algorithm. The algorithm takes into account multiple products that have different due dates plus different process flows. Using the algorithms with linear program techniques, the method of this invention produces more accurate start schedules and high resource utilization while minimizing the number of late orders. This method has been found useful for foundry wafer fab systems to maximize output in wafer production and minimize cycle time in real production environments.

BRIEF DESCRIPTION OF THE DRAWINGS

This invention will be described with reference to the accompanying drawings, wherein:

FIG. 3 is two tables that show the equations of X-ratio definition and the upper bound constraint generation algorithm.

FIG. 4A is a table with lot simulation examples.

FIG. 4B is a table with lots selected by X-ratio rule.

FIG. 4C is a table with lots selected by the lower bound rule.

FIG. 4D is a table with lots selected by the upper bound rule, and

FIG. 4E is a table with lots in final release order.

DETAILED DESCRIPTION OF THE PREFERRED EMBODIMENT

Figure 1:
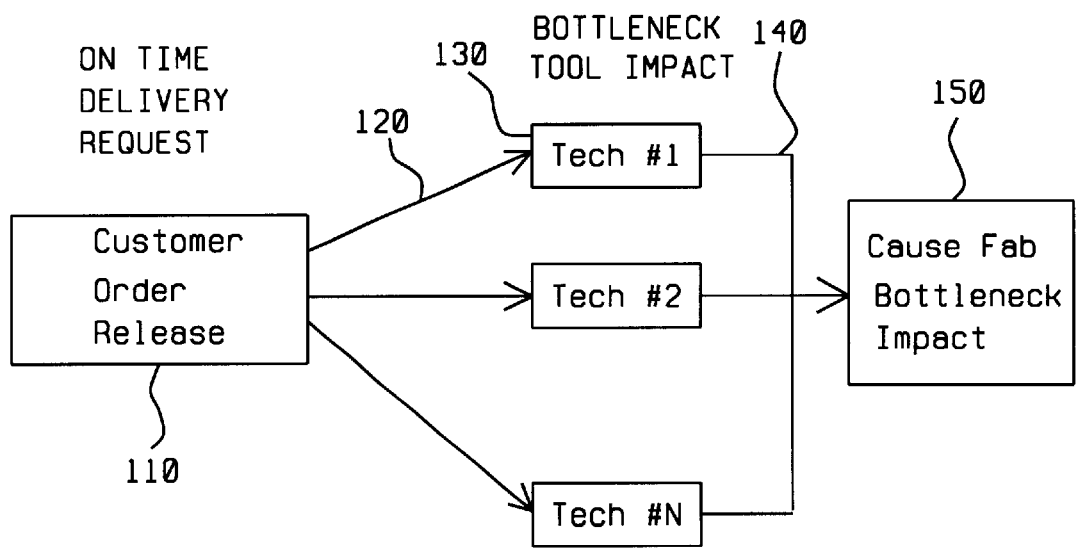
FIG. 1 is a flow diagram of the original way an order is released in prior art.

FIG. 1 shows a flow diagram that best describes the prior art and the problem that exists with that prior art. A chip manufacturing fab line runs on a continuous 24 hours-a-day basis with a mix of customer orders. The choice of different tool technology depends on their function and type, such as logic or SRAM products, and can be varied during fabrication. Each tool has an inherent speed and capacity, and one tool may be dependent on another forcing undesirable idle time for these expensive tools. As a customer order begins 110, a delivery date is given to the customer, and the customer has an expectation that the date will be met. As the order is released 120 to the first tool for processing, that required technology tool (Tech #) 130 begins its work. Once that tool is completed 140 it goes to the next tool. Multiple customer orders are begun if the following order or orders use a different tool so as to keep all tools as busy as possible. When the orders reach the next tool 150, some may need the same tool and have to wait or some may not need the tool at all and the tool remains idle.

Complexity increases as more tools are needed to satisfy the customer order. More tool idle time and order waiting result. Missed customer completion dates and reduced customer satisfaction result. The cost of the idle tools and lost opportunity to use all tools concurrently increases the cost of running the fab line.

Figure 2:
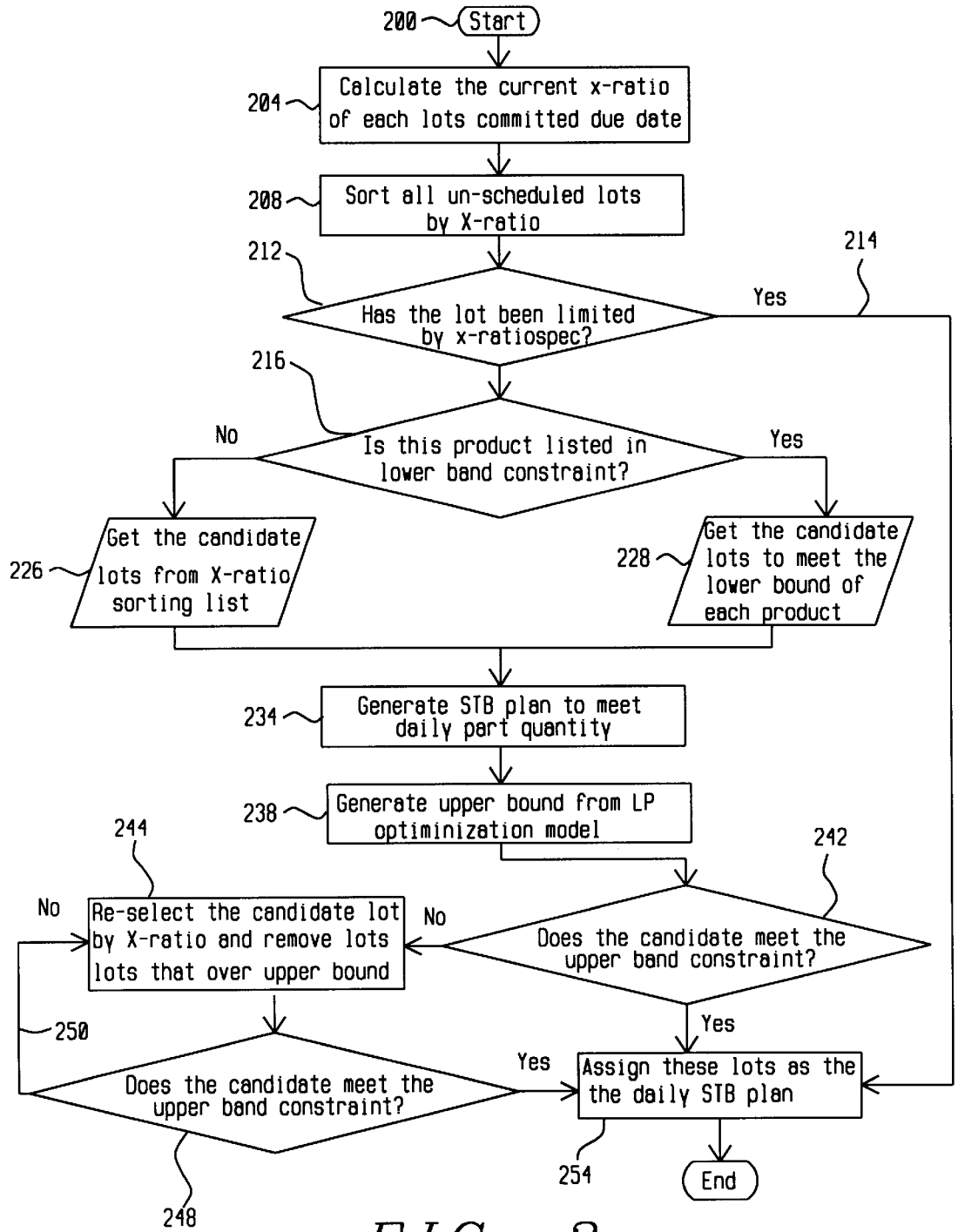
FIG. 2 is a flow diagram of the lot release control model method of the present invention.

FIG. 2 is a flow diagram of the new method of the lot release control model. This is used for each customer order. Each order is put through the constraints of the model to determine when to start its production in relation to other work so that all the tools of the fab line will be in use. An X-ratio is calculated for each lot that gives a relationship between the start dates and the processing time. This x-ratiospec, it is sometime called, becomes the primary value by which the lots are sorted to insure customer delivery dates are always meet. The lots, in X-ratio sorted order, are processed based on this order using linear programing (LP) equations techniques. An upper bound on the high x-ratio value (lots where time to produce is not critical) is chosen by manufacturing engineers to insure that time constrained lots are always processed first. A lower bound constant on the X-ratio is also chosen to immediately get those lots into production regardless of the LP equations results. Use of this X-ratio provides an easy to use and calculate value to bound (upper and lower) the linear program equations making the method results fast and easy to program. FIG. 3 shows the necessary equations to control the model. The term X-ratio 302 is defined as follows 304:

$$X\text{-ratio}=(Ci-D)/Ti$$

where:

$Ci$=Committed due date of the ith lot $D$=Wafer start date $Ti$=Theoretical process time of the ith lot The upper bound constraint generation uses a Linear Programming (LP) model to handle the variables required by the technology processing 310. The Max. Daily Output becomes the daily start quantity and is the upper bounds constraint of each technology tool to avoid bottlenecks. The LP model is as follows:

Objective Function 320

$$\text{Max Daily Output: } Y=X_1+X_2+\ldots+X_j$$

Subject to 330

$$a_{11}X_1+a_{12}X_2+\ldots+a_{1j}X_j \leq S_1 * W_1 * A_1 * 24 \_\_(\text{the\_ first\_tools\_constraint})$$

$$a_{12}X_1+a_{22}X_2+\ldots+a_{2j}X_j \leq S_2 * W_2 * A_2 * 24 \_\_(\text{the\_ second\_tools\_constraint})$$

$$\ldots$$

$$a_{i1}X_1+a_{i2}X_2+\ldots+a_{ij}X_j \leq S_i * W_i * A_i * 24 \_\_(\text{the\_ }_i\text{th\_tools\_constraint})$$

$$X_1 \geq 0, X_2 \geq, X_j \geq 0$$

where:

$Y$=daily_start_quantity $X_j$=the_daily_start_quatnity_of_the_$_j$th_technology_process $a_{ij}$=the_repetitve_times_of_the_$_i$th_tool_type_in_$_j$th_technology_process_flow $S_i$=total_tool_set_of_$_i$th_tool_type $W_i$=WPH(wafer_per_hour)_of_the_$_i$th_tool_type $A_i$=tool_available_time_of_$_i$th_tool_type Using this lot release model, there are three control constraints that control the process. They are the X-ratio, the lower bound constraint, and the upper bound constraint. Using these formulas and the lot release model method, appropriate start schedules result that provide high resource utilization with a minimum number of late orders.

To see the entire wafer start order release algorithm with the lot release model, it is best to do a simulation by using real wafer lots. FIG. 4 is a table 410 that contains a set of orders we can call the original order distribution. Each lot is given a lot number. The X-ratio has been calculated using the customer due date, the start date, and the process time of the lot. A product number is assigned for tracking. The quantity and the technology group are assigned by customer specification.

Before the model can be used, the equations must be set using assumptions based on past experience with the wafer line and customer requirements. Past processing has shown that an X-ratio of 3.8 is reasonable. A maximum daily output of the fab has been determined to be 250 pieces. For the lower bound constraints, two equations are set from customer requests. They are:

25 Logic≧50 pieces (pcs) for 0.25 Logic lower bound constraint

50 Logic≧25 pcs for 0.5 Logic lower bound constraint

For the upper bound constraints three equations are set as follows:

SRAM≦50 pcs for SRAM upper bound constraint

35 Logic≦75 pcs for 35 Logic upper bound constraint

Each product≦50 pcs for single product constraint

A daily start quantity (maximum daily output) is set to 250 pcs from past experience with the wafer line.

Using the lot release model in FIG. 2, the process begins 200 with the X-ratio calculation 204. This is called rule 1 of the model. Continuing with the lot release control model, we now have the necessary information to determine which lots should be considered for production first. Next there is a sort of all these unscheduled lots by X-ratio 208. In FIG. 4B are four lots that meet the X-ratio criteria. From the model 212 they meet the criteria and they take the path 214 that routes them to production and assigns them to the Start To Build (STB) plan.

The second lower bound constraint is now done on the remaining lots 216. In FIG. 4C there are two lots that meet the lower bound constraint 228. This is called rule 2. They are added to the STB plan 234. These are the lots that have special customer preferences. Remaining lots that do not meet the lower bounds are sorted by X-ratio 226.

The upper bound LP formula is used to select the remaining lots 238. In FIG. 4D four lots meet the upper bound constraint of the formula. This is called rule 3. If there were too many lots that meet the upper bound 242 then the STB plan needs to reselect lots by the sorted X-ratio and remove the lots with the highest X-ratio 244. This is done until the STB plan meets the upper bound constraint without exceeding the maximum daily output value of 250 that was set at the beginning for the fab 248. In this simulation, two of the lots are not part of the day's STB plan due to the 250 piece maximum being attained 254. FIG. 4E has the final order of the lots selected.

The method of the invention provides several advantages over the prior art. These include reduced expensive wait and idle time with the use of linear program techniques, the ability to create optimized start schedules, and high resource utilization with a minimum number of late customer orders.

While the invention has been particularly shown and described with reference to preferred embodiments thereof, it will be understood by those skilled in the art that various changes in form and details may be made without departing from the spirit and scope of the invention.

What is claimed is:

1. A start order release method, comprising the steps of:

a. providing a control model that provides a step-by-step process to follow which optimizes the release of work lots to the manufacturing line;

b. providing a set of control algorithms with steps that optimize production of lots on a wafer fab line;

c. calculating an X-ratio comprised of a start date of processing, the committed date due, and the theoretical process time:

$$X\text{-ratio} = (Ci - D)/Ti$$

where:
Ci=Committed due date of the ith lot
D=Wafer start date
Ti=Theoretical process time of the ith lot;

d. providing a lower-bound constraint that gives added weight to customer's needs;

e. providing an upper-bound constraint using linear programming techniques to handle the technology process variables such as:

Max Daily Output: $Y = X_1 + X_2 + \ldots + X_j$ $a_{11}X_1 + a_{12}X_2 + \ldots + a_{1j}X_j \leq S_1 * W_1 * A_1 * 24$ _(the_ first_tools_constra int)

$a_{12}X_1 + a_{22}X_2 + \ldots + a_{2j}X_j \leq S_2 * W_2 * A_2 * 24$ _(the_ second_tools_ constra int)

. . .

$a_{i1}X_1 + a_{i2}X_2 + \ldots + a_{ij}X_j \leq S_i * W_i * A_i * 24$ _(the_ _i_th_tools_constra int)

$X_1 \geq 0, X_2 \geq, X_j \geq 0$ where:
Y=daily_start_quantity
$X_j$=the_daily_start_quantity_of_the_$_i$th_techno log y_process
$a_{ij}$=the_repetitve_times_of_the_$_i$th_tool_type_ in_$_j$th_techno log y_process_flow
$S_i$=total_tool_set_of_$_i$th_tool_type
$W_i$=WPH(wafer_per_hour)_of_the_$_i$th_tool_type
$A_i$=tool_available_time_of_$_i$th_tool_type
and, f. generating an optimized Start-To-Build plan (STB) based on the constraint rules of this method that maximizes use of the manufacturing production line.

2. The start order release method of claim 1, wherein the control model provides a plurality of possible start order combinations based on the data inputted.

3. The start order release method of claim 1, wherein said set of algorithms with steps provides the process to choose the lots that optimize manufacturing production.

4. The start order release method of claim 1, wherein said X-ratio provides a plurality of values required to sort and optimize the lots.

5. The start order release method of claim 1, wherein said upper bound constraint uses several technologies being processed with specific tools having many variables required to do the processing.

6. The start order release method of claim 1, wherein said Start-To-Build plan (STB) is a daily production plan optimized by the start order release model and can continually be updated as processing variables change.

7. The start order release method, comprising the steps of:

a. providing a control model that provides a step-by-step process to follow which optimizes release of work lots to process;

b. providing a set of control algorithms with steps that optimize production of lots in any process;

c. calculating an X-ratio comprised of the start date of processing, the committed date due, and the theoretical process time:

$$X\text{-ratio} = (Ci - D)/Ti$$

where:
Ci=Committed due date of the ith lot
D=Wafer start date
Ti=Theoretical process time of the ith lot;

d. providing a lower-bound constraint that gives added weight to customer's needs;

e. providing an upper-bound constraint using linear programming techniques to handle the process variables as:

Max Daily Output: $Y = X_1 + X_2 + \ldots + X_j$ $a_{11}X_1 + a_{12}X_2 + \ldots + a_{1j}X_j \leq S_1 * W_1 * A_1 * 24$ _(the_ first_tools_constra int)

$a_{12}X_1 + a_{22}X_2 + \ldots + a_{2j}X_j \leq S_2 * W_2 * A_2 * 24$ _(the_ second_tools_ constra int)

. . .

$a_{i1}X_1 + a_{i2}X_2 + \ldots + a_{ij}X_j \leq S_i * W_i * A_i * 24$ _(the_ _i_th_tools_constra int)

$X_1 \geq 0, X_2 \geq, X_j \geq 0$ where:
Y=daily_start_quantity
$X_j$=the_daily_start_quantity_of_the_$_i$th_techno log y_process
$a_{ij}$=the_repetitve_times_of_the_$_i$th_tool_in_$_j$th_ techno log y_process
$S_i$=total_tool_set_of_$_i$th_tool_type
$W_i$=WPH(wafer_per_hour)_of_the_$_i$th_tool_type
$A_i$=tool_available_time_of_$_i$th_tool_type
and, f. generating an optimized Start-To-Build plan (STB) based on the constraint rules of this method that maximizes use of the manufacturing production line.

8. The start order release method of claim 7, wherein the control model provides a plurality of possible start order combinations based on the data inputted.

9. The start order release method of claim 7, wherein said set of algorithms with steps provides a process to choose lots that optimize any production.

10. The start order release method of claim 7, wherein said X-ratio provides a plurality of values required to sort and optimize lots.

11. The start order release method of claim 7, wherein said upper-bound constraint uses several technologies being processed with specific tools having many variables required to do the processing.

12. The start order release method of claim 7, wherein said Start-To-Build plan (STB) is the daily production plan optimized by the start order release model and can continually be updated as processing variables change.

13. A wafer start order release method comprising the steps of:

a. providing three rules as constraints to control which lots are processed;

b. providing actual start and due dates of lot to be processed;

c. providing maximum daily output of the process as the primary control value;

d. calculating a X-ratio comprised of a start date of processing, the committed date due, and the theoretical process time:

$$X\text{-ratio}=(C_i-D)/T_i$$

where:
$C_i$=Committed due date of the ith lot
$D$=Wafer start date
$T_i$=Theoretical process time of the ith lot;
and, e. generating optimized processing order using data applied to linear programming equations using a calculated X-ratio as two of the constraints setting upper and lower bounds.

14. The wafer start order release method of claim 13, wherein three rules provide the decision point that determines the order in which lots are to be processed.

15. The wafer start order release method of claim 13, wherein actual start and due dates provide an accurate control of lot order.

16. The wafer start order release method of claim 13, wherein the maximum daily output places an overall constraint so that the process is realistic and can be accomplished with known tools.

17. The wafer start order release method of claim 13, wherein the optimized processing order in the STB can be continually adjusted by new, updated variables and processing changes in a real environment.

* * * * *